April 11, 1961 F. GEORGES 2,978,924
MOVEMENT CONTROL MEANS
Filed May 6, 1958 2 Sheets-Sheet 1
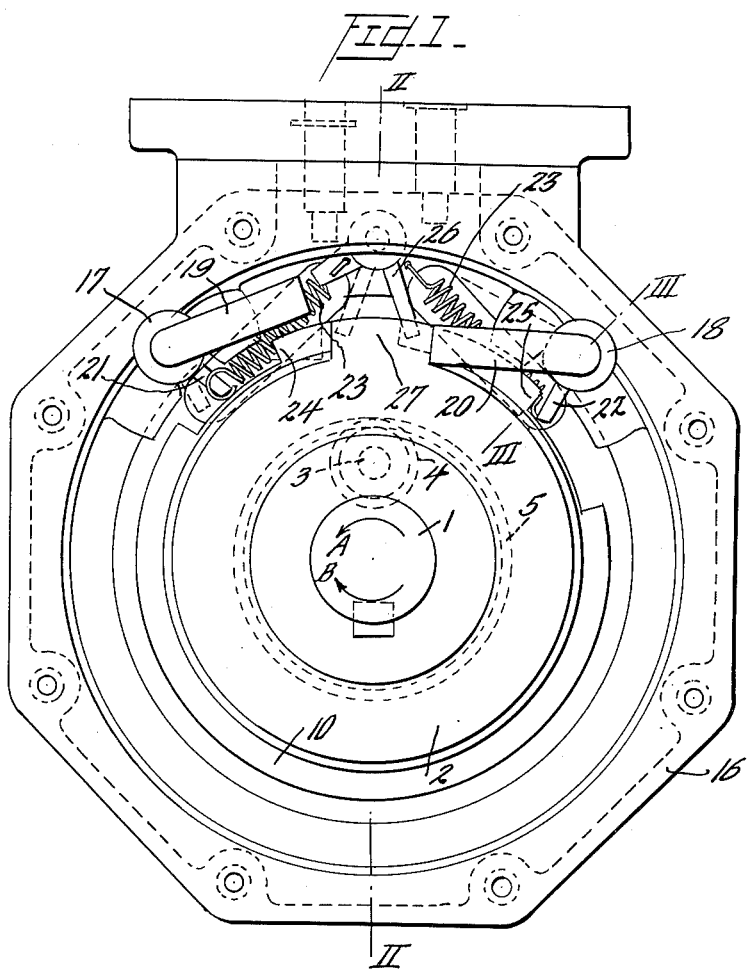
INVENTOR
Felix Georges
BY Watson, Cole, Grindle & Watson
ATTORNEY

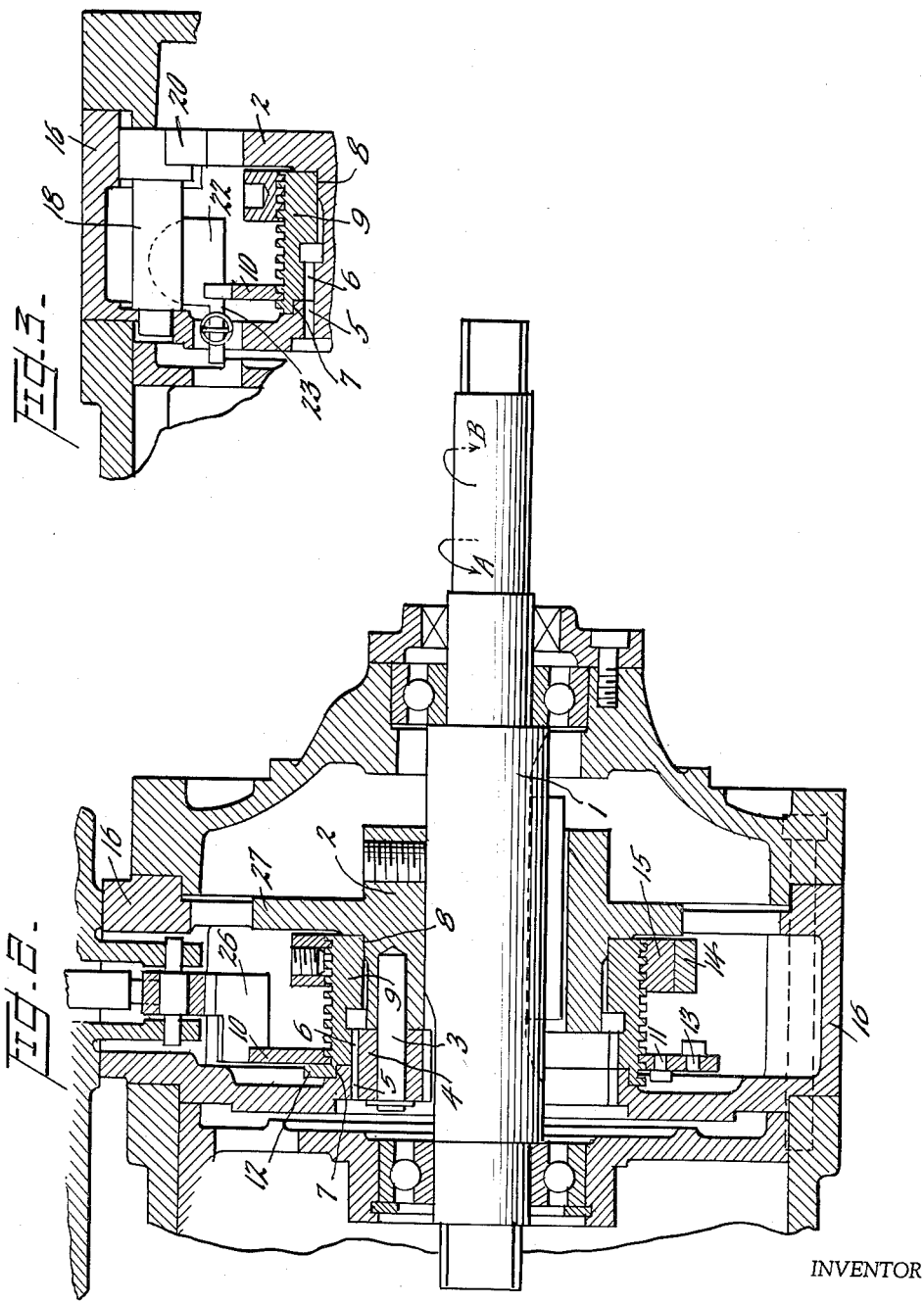

United States Patent Office 2,978,924
Patented Apr. 11, 1961

2,978,924

MOVEMENT CONTROL MEANS

Felix Georges, Uccle, Belgium, assignor to Societe Auxiliarie d'Industrie (Sadi) S.P.R.L., Forest, Belgium, a company Filed May 6, 1958, Ser. No. 733,804

Claims priority, application Belgium May 14, 1957

14 Claims. (Cl. 74—526)

This invention relates to movement control means, hereinafter referred to as a "stroke selector" which can be applied or adapted to any rotary member such as for example coupling devices, telecontrols of sluice-valves, flap-valves, gates and the like.

An object of the invention is to create an artificial stop which can be controlled in either direction of rotation, acting in such a way as only to allow the device to which the selector is applied to act after a certain pre-selected number of revolutions, control being able to be effected at each revolution.

According to the invention the stroke selector comprises a hub keyed on a drive shaft which entrains in rotation a screw-threaded member, and a nut arranged on the threaded member to move between a fixed stop and a stop whose position is adjustable, said nut controlling catch triggers of a projection solid with the hub.

According to an optional feature of the invention, the threaded member is driven by a pinion entrained by the hub, which pinion rolls on a fixed first toothed rim and at the same time on a second toothed rim carried on the threaded member, said second rim having at least one tooth less than the first.

The control of the catch triggers by the movable nut can be effected by blades which guide said triggers into the plane of the projection. For this purpose the movable nut preferably has grooves in which the blades engage.

Advantageously, the movable nut can be provided with a groove which co-operates with a blade controlling a signal system.

A specific embodiment of the invention will now be described, by way of example, with reference to the accompanying drawings, in which:

Figure 1 is a view from the end of the centre axis of the selector.

Figure 2 is a sectional view taken on the line II—II in Figure 1, and

Figure 3 is a sectional view of an interior portion of the selector taken on the line III—III in Figure 1.

In the drawings, 1 indicates a drive shaft which is supposed to be able to make a certain number of revolutions in either direction of rotation before actuating the stop devices of the appliance being used, and 2 indicates a hub which is keyed onto the shaft 1 for rotation with said shaft.

The hub 2 carries a pivot 3 on which turns freely a pinion 4 which meshes with a fixed internally toothed rim 5 and, at the same time, with another internally toothed rim 6, which is guided by, and rotates freely on, two cylindrical bearings 7 and 8. The freely rotatable rim 6 has at least one tooth less than the fixed rim 5, in order to allow a relatively slow rotation of the rim 6 in relation to 5.

The free internally toothed rim 6 has on its periphery a screw-threaded portion 9 on which a thin nut 10 can travel freely. A lug 11 is provided on one of the faces of the nut 10 which can abut against a tongue 12 solid with the toothed rim 6, and another lug 13 is provided on the other face of the nut 10 which can abut against an exterior stop 14 of an adjustable nut 15 screwed on the internal toothed rim 6.

The fixed rim 5 is in one piece with a case 16 solid with the frame of the appliance and this case 16 has two seatings 17 and 18 (Figure 1) in which pivot two triggers or levers 19 and 20 acting as stops and actuated respectively by blades 21 and 22 controlled by a spring 23 hooked at one end to the blade and at the other end to the case 16 or some other fixed point.

The nut 10 has, in addition to its lugs 11 and 13, two cogs or lips 24 and 25, which respectively acuate the triggers or levers 19 and 20 by their thrust on the blades 21 and 22 and on a blade 26 which controls the signal system.

Finally, the hub 2 has a projection 27 which co-operates with the triggers or levers 19 and 20.

The appliance above described operates as follows:

When the shaft 1 is rotated in the direction of the arrow A, the nut 10 is entrained towards the tongue 12 of the rim 6, and at the end of its travel the lug 11 comes into contact with the tongue 12. At this moment the nut 10 is entrained by the tongue 12 and the cog or lip 24 (Figure 1) of the nut 10 swings the trigger or lever 19 by the intermediary of the blade 21 so that the projection 27 of the hub 2 can abut against the trigger 19. This stops the shaft and allows the appliance to which it is coupled to begin operating.

When the direction of rotation of the shaft 1 is reversed in the direction of the arrow B, the spring 23 pulls back the lever 19 and the nut 10 travels on the screw-threaded portion 9 towards the adjustable nut 15, to a distance controlled in advance by the position of the nut 15 on the rim 6.

At the end of the travel, the lug 13 of the nut 10 abuts against the stop 14 of the adjustable nut 15. At this point, the lip or cog 25 of the nut 10 swings the trigger or lever 20 by means of the blade 22. The trigger 20 is thus placed in front of the projection 27 of the hub 2, simultaneously actuating the signal system blade 26 and also the stop device.

It will be noted that with a stroke selector device of this kind, the putting into operation of the appliance being used can be retarded, allowing the control shaft to make a certain number of revolutions before controlling the appliance being used, and that in either direction.

I claim:

1. A stroke selector, comprising a drive shaft, hub means keyed on the drive shaft, a screw-threaded member entrained in rotation by said drive shaft, a fixed first and an adjustable second stop means, nut means arranged on said screw-threaded member for movement between said first and said second stop means, catch trigger members arranged to be actuated by said nut means, projection means arranged on said hub means for co-operation with said catch trigger members, and actuating means engageable by and movable with said nut means at the opposite extremities of its said movement, said actuating means being connected to said catch trigger members and utilizing the rotational forces on said nut means for moving said catch trigger members into the rotational path of said projection means.

2. A stroke selector, comprising a drive shaft, hub means keyed on the drive shaft, a screw-threaded member entrained in rotation by said drive shaft, a fixed first and an adjustable second stop means, nut means arranged on said screw-threaded member for movement between said first and said second stop means, catch trigger members arranged to be actuated by said nut means, projection means arranged on said hub means for co-operation with said catch trigger members, and blade means effective to control said catch trigger members and to guide said catch trigger members in the plane of said projection means, said catch trigger members being mounted for movement to and from operative positions in the rotational path of said projection means, resilient means respectively connected to said catch trigger members for maintaining same normally retracted from their operative positions, said blade means projected radially toward the rotational axis of said nut for movement circumferentially with the nut, said blade means being connected to their respective catch trigger members to operatively position same incident to such movement, and means on the nut for moving and engaging said blade means to operatively position said trigger members.

3. A stroke selector, comprising a drive shaft, hub means keyed on the drive shaft, a screw-threaded member entrained in rotation by said drive shaft, a fixed first and an adjustable second stop means, nut means arranged on said screw-threaded member for movement between said first and said second stop means, catch trigger members arranged to be actuated by said nut means, projection means arranged on said hub means for co-operation with said catch trigger members, and blade means effective to control said catch trigger members and to guide said catch trigger members in the plane of said projection means, said nut means being provided with grooves in which said blade means engage, said catch trigger members being mounted for movement to and from operative positions in the rotational path of said projection means, resilient means respectively connected to said catch trigger members for maintaining same normally retracted from their operative positions, said blade means projected radially toward the rotational axis of said nut for movement circumferentially with the nut, said blade means being connected to their respective catch trigger members to operatively position same incident to such movement, and means on the nut for moving and engaging said blade means to operatively position said trigger members.

4. In a stroke selector as claimed in claim 1, the provision of blade means arranged to control a signal system, said blade means engaging in a groove provided in said nut means for actuation by said nut means.

5. A stroke selector, comprising a drive shaft, hub means keyed on the drive shaft, a screw-threaded member entrained in rotation by said drive shaft, a fixed first and an adjustable second stop means, nut means arranged on said screw-threaded member for movement between said first and said second stop means, catch trigger members arranged to be actuated by said nut means, projection means arranged on said hub means for abutting engagement with said catch trigger members, first blade means arranged to control a signal system, and second blade means actuated by said nut means to control said catch trigger members and to project said catch trigger members into the path of said projection means.

6. A stroke selector as claimed in claim 5, wherein said first and said second blade means engage in grooves in said nut means for operation by said nut means.

7. A stroke selector comprising a drive shaft, hub means keyed on said drive shaft, a fixed first toothed rim, a second rotatable toothed rim having at least one tooth less than said first rim and carrying a screw-threaded member, a pinion entrained by said hub means and meshing with said first and said second toothed rims to rotate said threaded member, a fixed first stop means and an adjustable second stop means, nut means arranged on said screw-threaded member for movement between said first and said second stop means, catch trigger members arranged to be actuated by said nut means, and projection means arranged on said hub means for co-operation with said catch trigger members, said catch trigger members being mounted for movement to and from operative positions in the rotational path of said projection means, resilient means respectively connected to said catch trigger members for maintaining same normally retracted from their operative positions, said blade means projected radially toward the rotational axis of said nut for movement circumferentially with the nut, said blade means being connected to their respective catch trigger members to operatively position same incident to such movement, and means on the nut for moving and engaging said blade means to operatively position said trigger members.

8. A stroke selector comprising a drive shaft, hub means keyed on said drive shaft, a fixed first toothed rim, a second rotatable toothed rim having at least one tooth less than said first rim and carrying a screw-threaded member, a pinion entrained by said hub means and meshing with said first and said second toothed rims to rotate said threaded member, a fixed first stop means and an adjustable second stop means, nut means arranged on said screw-threaded member for movement between said first and said second stop means, catch trigger members arranged to be actuated by said nut means, projection means arranged on said hub means for co-operation with said catch trigger members and blade means actuated by said nut means to control said catch trigger members and to project said catch trigger members into the path of said projection means.

9. A stroke selector comprising a drive shaft, hub means keyed on said drive shaft, a fixed first toothed rim, a second rotatable toothed rim having at least one tooth less than said first rim and carrying a screw-threaded member, a pinion entrained by said hub means and meshing with said first and said second toothed rims to rotate said threaded member, a fixed first stop means and an adjustable second stop means, nut means arranged on said screw-threaded member for movement between said first and said second stop means, catch trigger members arranged to be actuated by said nut means, projection means arranged on said hub means for co-operation with said catch trigger members, first blade means arranged to control a signal system, and second blade means actuated by said another means to control said catch trigger members and to project said catch trigger members into the path of said projection means.

10. A stroke selector as claimed in claim 8, wherein said blade means engage in grooves in said nut means for operation by said nut means.

11. A stroke selector as claimed in claim 9, wherein said first and said second blade means engage in grooves in said nut means for operation by said nut means.

12. In a stroke selector the combination of a drive shaft, hub means keyed on said drive shaft, a fixed first toothed rim, a second rotatable toothed rim having at least one tooth less than said first rim and carrying a screw-threaded member, a pinion entrained by said hub means and meshing with said first and said second toothed rims to rotate said threaded member, a fixed first stop means and an adjustable second stop means, nut means arranged on said screw-threaded member for movement between said first and said second stop means, projectable and retractable catch trigger members arranged to be projected by said nut means, and projection means arranged on said hub means for co-operation with said catch trigger members in their projected positions.

13. In a stroke selector the combination of a drive shaft, hub means keyed on said drive shaft, a fixed first toothed rim, a second rotatable toothed rim having at least one tooth less than said first rim and carrying a screw-threaded member, a pinion entrained by said hub means and meshing with said first and said second toothed rims to rotate said threaded member, a fixed first stop means and an adjustable second stop means, nut means arranged on said screw-threaded member for movement between said first and said second stop means, catch trigger members arranged to be actuated by said nut means, projection means arranged on said hub means for co-operation with said catch trigger members and blade means controlled by engagement with said nut means to control said catch trigger members and to project said catch trigger members into the rotational path of said projection means.

14. In a stroke selector the combination of a drive shaft, hub means keyed on said drive shaft, a fixed first toothed rim, a second rotatable toothed rim having at least one tooth less than said first rim and carrying a screw-threaded member, a pinion entrained by said hub means and meshing with said first and said second toothed rims to rotate said threaded member, a fixed first stop means and an adjustable second stop means, nut means arranged on said screw-threaded member for movement between said first and said second stop means, catch trigger members arranged to be actuated by said nut means, projection means arranged on said hub means for co-operation with said catch trigger members, first blade means arranged to control a signal system, and second blade means operatively engaged and controlled by said nut means to control said catch trigger members and to project said catch trigger members into the rotational path of said projection means,

References Cited in the file of this patent

UNITED STATES PATENTS

| | | |
|---|---|---|
| 857,551 | Dillon | June 18, 1907 |
| 2,468,002 | Teal | Apr. 19, 1949 |

FOREIGN PATENTS

| | | |
|---|---|---|
| 5,341 | Great Britain | Aug. 17, 1911 |
| 252,093 | Great Britain | May 20, 1926 |
| 675,606 | Great Britain | July 16, 1952 |